(12) United States Patent
Balaji et al.

(10) Patent No.: US 11,537,904 B2
(45) Date of Patent: Dec. 27, 2022

(54) FRAMEWORK TO ASSESS TECHNICAL FEASIBILITY OF DESIGNS FOR ADDITIVE MANUFACTURING

(71) Applicant: Tata Consultancy Services Limited, Mumbai (IN)

(72) Inventors: Sukhdev Balaji, Bengaluru (IN); Goutham Pathuri, Bengaluru (IN); Ankur Krishna, Pune (IN); Pramod Ramdas Zagade, Pune (IN); Arockiam Daniel, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1026 days.

(21) Appl. No.: 16/172,681

(22) Filed: Oct. 26, 2018

(65) Prior Publication Data
US 2019/0220754 A1 Jul. 18, 2019

(30) Foreign Application Priority Data

Oct. 27, 2017 (IN) .......................... IN201721038136

(51) Int. Cl.
*G06N 5/02* (2006.01)
*B33Y 50/00* (2015.01)
(Continued)

(52) U.S. Cl.
CPC .............. *G06N 5/027* (2013.01); *B33Y 50/00* (2014.12); *G06F 30/00* (2020.01); *G06F 30/17* (2020.01); *G06N 5/04* (2013.01); *G06Q 50/04* (2013.01)

(58) Field of Classification Search
CPC .......... G06Q 10/00–50/00; G06N 3/00–20/00; G06F 1/00–30/00; B33Y 10/00–80/00
(Continued)

(56) References Cited

U.S. PATENT DOCUMENTS

| 5,287,284 A | * | 2/1994 | Sugino | ................... G06Q 10/06 700/121 |
| 5,357,439 A | * | 10/1994 | Matsuzaki | ....... G05B 19/41865 700/98 |

(Continued)

FOREIGN PATENT DOCUMENTS

CN         105571629         5/2016

*Primary Examiner* — Alan S Miller
(74) *Attorney, Agent, or Firm* — Finnegan, Henderson, Farabow, Garrett & Dunner LLP

(57) ABSTRACT

A framework for assessing technical feasibility of additive manufacturing of an engineering design. This framework needs to be based on preliminary identification of key parameters that influence the decision making process. The parameters may also be customized for a particular application. Each of these parameters can be assigned weightage either relative or arrived at by paired comparison using a pre-determined minimum point method. Each of the attributes are then assigned scores which are then multiplied by the weightages assigned. The summation of all such scores on a weighted average basis indicates the potential for 3D printing of that part or assembly. It offers to select the right part to leverage the benefit of additive manufacturing. It narrows down on the ideal manufacturing process for the qualified parts and proposes to reduce subjectivity by using paired comparison of attributes. It also provides a faster assessment of technical aspects of the design.

6 Claims, 3 Drawing Sheets

(51) Int. Cl.
*G06N 5/04* (2006.01)
*G06F 30/00* (2020.01)
*G06F 30/17* (2020.01)
*G06Q 50/04* (2012.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,110,213 | A * | 8/2000 | Vinciarelli | G06F 30/00 703/1 |
| 6,931,293 | B1 * | 8/2005 | Douglas | G06Q 10/04 700/95 |
| 7,219,068 | B2 * | 5/2007 | Zelek | G06Q 10/04 705/7.29 |
| 7,343,209 | B2 * | 3/2008 | Anelle | G06F 30/15 700/87 |
| 7,408,551 | B1 * | 8/2008 | Kazmer | G06F 17/10 345/636 |
| 7,542,952 | B2 * | 6/2009 | Yang | G06F 3/0481 706/45 |
| 8,479,089 | B2 * | 7/2013 | Yucel | G06Q 10/0637 715/267 |
| 2011/0112981 | A1 * | 5/2011 | Park | G06F 16/9535 705/347 |
| 2014/0297357 | A1 * | 10/2014 | Zeng | G06Q 10/06 705/7.26 |
| 2015/0177158 | A1 * | 6/2015 | Cheverton | B22F 10/37 700/119 |
| 2015/0324490 | A1 * | 11/2015 | Page | G06Q 30/0621 700/98 |
| 2016/0054231 | A1 * | 2/2016 | Hess | G01N 21/8806 702/82 |
| 2017/0153627 | A1 * | 6/2017 | Jäger | G06N 5/022 |

\* cited by examiner

| Part A - Pre Assessment Inputs | |
|---|---|
| Does 3D printing the part / Sub assembly violate any IP / regulation? | No |
| Is the part subjected to mission critical applications? | No |

| Part B - Inputs for Importance Rating | |
|---|---|
| Near net shape manufacturing feasibility with minimal machining post Additive Manufacturing | 1 |
| Manufacturing complexity (multiple conventional manufacturing set ups, complex machining) | 2 |
| Manufacturing lead time | 3 |
| Expensive tooling | 4 |
| Manufacturing scrap rates of conventional process (current process) | 5 |
| Expensive part / assembly cost | 6 |

| Part C - Inputs for Assessment & Process Selection | |
|---|---|
| Is it possible to consolidate the part with its proximate parts? If so, how many parts can be consolidated? | No |
| What is the expected manufacturing lead time in days? | 28.0 |
| How many steps / set ups are required in the current manufacturing process? | >7 |
| What is the manufacturing scrap rate of the current conventional process (%)? | 45.0% |
| What percentage is the BOM cost of the part / assembly compared to the overall product BOM cost? | 7.0% |
| What is the cost of the current tooling for the part? | High Costs |
| What is the Scope for Part Customization? | No Scope at all |
| What is the tightest manufacturing tolerance allowed in the unmachined areas of the AM part / assembly? (mm) | 0.2 |
| What is the least surface finish expected in the unmachined areas of the AM part / assembly? (Ra in micrometer) | 25.0 |

FIG. 2

FRAMEWORK TO ASSESS TECHNICAL FEASIBILITY OF DESIGNS FOR ADDITIVE MANUFACTURING

PRIORITY CLAIM

This U.S. patent application claims priority under 35 U.S.C. § 119 to India Application No. 201721038136, filed on Oct. 27, 2017. The entire contents of the abovementioned application are incorporated herein by reference.

TECHNICAL FIELD

The embodiments herein generally relates to a system and method for assessing technical feasibility of additive manufacturing of an engineering design and, more particularly, recommending a comprehensive framework that can help potential users to select a most suitable additive manufacturing process for the engineering design.

BACKGROUND

Today, additive manufacturing is a rapidly emerging technology to produce parts having complex shapes. It uses layer-by-layer deposition of material to build three dimensional structures. There are very few limitations on the geometry of parts that can be produced using additive manufacturing technology. It offers a great freedom to designers to design products of any complex shape with least possible amount of material and a target of minimum weight to achieve required functionality. Many forms of active additive manufacturing processes are used by industries. However, it is critical to analyze the key challenges to adopt a most suitable additive manufacturing processes. Further, the limited range of materials that can be used in additive manufacturing processes is one of the biggest challenges.

Traditional additive manufacturing processes are used for production of finished parts or assemblies that can directly be used in endues product. Yet, these processes have limitations in terms of materials, size, surface finish, accuracy, production speed and high machine & material costs. These cannot be universally applied across all parts on an engineering design under additive manufacturing process. Therefore, there is a need for an aid/tool that will help in analyzing qualitatively as to which parts can be efficiently designed with the current state of technologies.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for assessing technical feasibility of additive manufacturing of one or more parts of an engineering design.

In one aspect, a system for assessing technical feasibility of additive manufacturing of one or more parts of an engineering design. The system comprises a processor, a memory communicatively coupled to the processor and the memory contains instructions that are readable by the processor, a receiver module is configured to receive at least one input from user, a preliminary assessment module is configured for quick assessment of the engineering design, wherein the preliminary assessment module comprising of a plurality of attributes for the quick assessment of one or more aspects of the engineering design, a weightage assigning module is configured to assign weightage corresponding to each of the plurality of attributes, a detailed assessment module is configured for assessment of each of the plurality of attributes by using decision matrix method and a recommendation module is configured to recommend the most suitable additive manufacturing processes for the engineering design based on one or more predefined design rules.

In another aspect, a method for assessing technical feasibility of additive manufacturing of one or more parts of an engineering design. The method comprises receiving at least one input from an user, wherein the received at least one input directs a preliminary assessment, importance rating and technical assessment of the engineering design, assessing one or more aspects of the engineering design, assigning weightage corresponding to each of the plurality of attributes, assessing each of the plurality of attributes by using decision matrix method and recommending, at a recommendation module, the most suitable additive manufacturing processes for the engineering design based on one or more predefined design rules.

In yet another aspect, a non-transitory computer readable medium storing one or more instructions which when executed by a processor on a system, cause the processor to perform method for assessing technical feasibility of additive manufacturing of one or more parts of an engineering design. The one or more instructions comprises receiving at least one input from an user, wherein the received at least one input directs a preliminary assessment, importance rating and technical assessment of the engineering design, assessing one or more aspects of the engineering design, assigning weightage corresponding to each of the plurality of attributes, assessing each of the plurality of attributes by using decision matrix method and recommending, at a recommendation module, the most suitable additive manufacturing processes for the engineering design based on one or more predefined design rules.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which:

FIG. 2 illustrates one or more assessment attributes of the disclosure according to an embodiment of the present disclosure.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
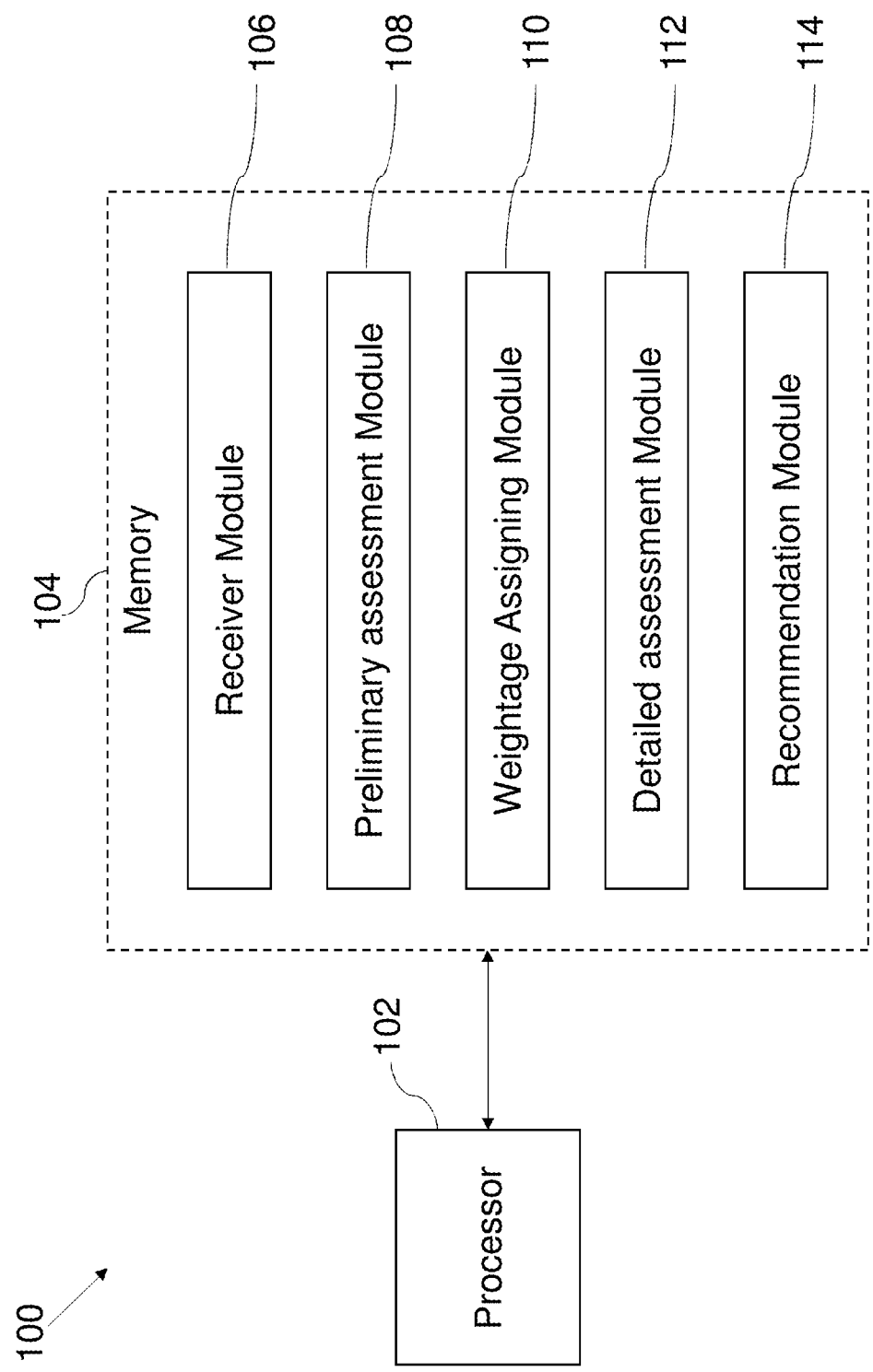
FIG. 1 illustrates a system for assessing technical feasibility of additive manufacturing of one or more parts of an engineering design according to an embodiment of the present disclosure.

Referring FIG. 1, a system 100 for assessing technical feasibility of additive manufacturing of one or more parts of an engineering design. The system 100 comprising a processor 102, a memory 104 communicatively coupled to the processor 102, a receiving module 106, a preliminary assessment module 108, an assigning module 110, a detailed assessment module 112, and a recommendation module 114.

In the preferred embodiment, the memory 104 contains instructions that are readable by the processor 102.

In the preferred embodiment, the receiver module 106 is configured to receive at least one input from user. The input from the user comprising one or more assessment attributes, technical data and economic data. Further, the received at least one input directs a preliminary assessment, importance rating and technical assessment of the engineering design. The receiving module also comprises a plurality of attributes for the preliminary assessment of one or more aspects of the engineering design.

Referring FIG. 2, an example, provides the one or more assessment attributes. It comprising inputs from the user. These inputs could be related to the regulatory, design, manufacturing and cost aspects of the design as shown. Further, the attributes comprising issues related to importance rating and process selection.

In the preferred embodiment, the preliminary assessment module 108 is configured for preliminary assessment of the engineering design, wherein the preliminary assessment module comprising of a plurality of attributes for the preliminary assessment of one or more aspects of the engineering design. Wherein the plurality of attributes of the receiving module are customizable to suit one or more aspects of the engineering design. The user is free to add or delete one or more attributes from the standard set of attributes.

In the preferred embodiment, the assigning module 110 is configured to assign weightage corresponding to each of the plurality of attributes. Weightage is assigned based on the paired comparison method. While comparing, every possible pair of attributes are compared to see which of the two attributes is more important. In this way all the possible pair combinations are tested and the final weightage for each attribute is arrived at.

In the preferred embodiment, the detailed assessment module 112 is configured for assessment of each of the plurality of attributes by using decision matrix method. The decision matrix method is used to arrive at a weighted overall score based on the attributes and weightages that are derived from the previous steps from the attributes receiving module and weightage assigning module. The user has to rank each of the attributes on a scale which is then multiplied by the weightage assigned to the attributes to get a score. The overall sum of all the scores thus obtained is the final assessment score.

In the preferred embodiment, the recommendation module 114 is configured to recommend the most suitable additive manufacturing processes for the engineering design based on one or more predefined design rules.

Figure 3:
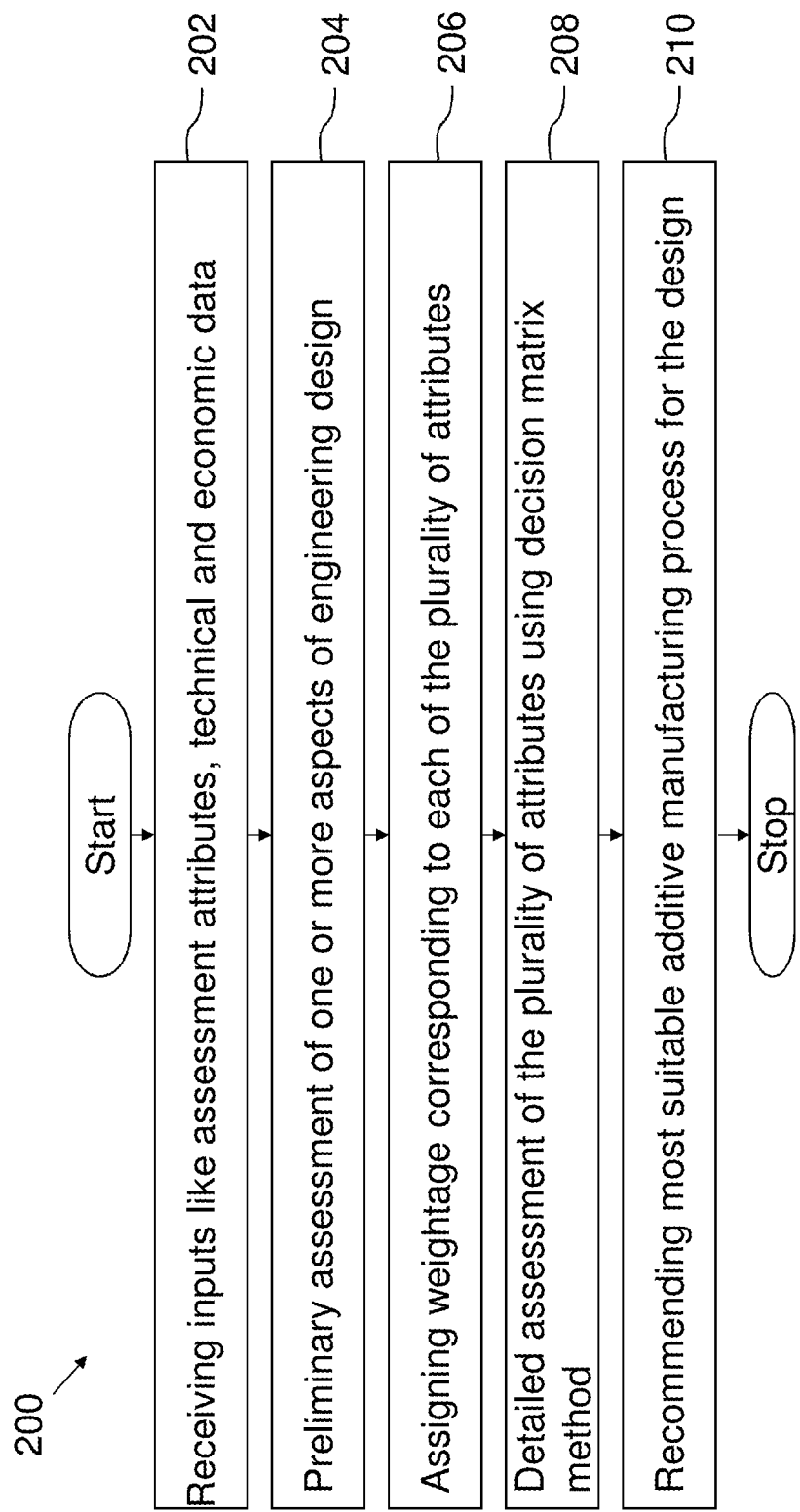
FIG. 3 illustrates a method for assessing technical feasibility of additive manufacturing of one or more parts of an engineering design according to an embodiment of the present disclosure.

Referring FIG. 3, a method 200 for assessing technical feasibility of additive manufacturing of one or more parts of an engineering design.

At step 202, where the process receives at least one input from a user, wherein the received at least one input directs a preliminary assessment, importance rating and technical assessment of the engineering design. These inputs are related to the regulatory aspects of the design as whether the given design is intellectual property laws compliant and also the criticality of the design. Further, the attributes comprising issues related to importance rating and process selection.

At step 204, where the process completes a preliminary assessment of one or more aspects of the engineering design using the preliminary assessment module.

At step 206, where the process assigns weightage corresponding to each of the plurality of attributes. Weightage is assigned based in comparison method. While comparison every possible pair of attributes are compared to see which of the two attributes is more important. In this way all the possible pair combination are tested and the final weightage for each attribute is arrived at.

At step 208, where the detailed assessment module completes a detailed assessment of each of the plurality of attributes by using decision matrix method. The decision matrix method is used to arrive to a weighted overall score based on the attributes and weightages that are derived from the previous steps from the attributes receiving module and weightage assigning module. The user has to rank each of the attributes on a scale which is then multiplied by the weightage assigned to the attributes to get a score. The overall sum of all the scores thus obtained the final assessment score.

At final step 210, where the process recommends most suitable additive manufacturing processes for the engineering design based on one or more predefined design rules.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method for assessing technical feasibility of additive manufacturing of one or more parts of an engineering design. This framework needs to be based on preliminary identifying key parameters that influence the decision making process. The parameters may also be customized for a particular application or product. Each of these parameters can be assigned weightage either relative or arrived at by paired comparison using a pre-determined minimum point method. The summation of all such scores on a weighted average basis indicates the potential for 3D printing of that part or assembly. Further, it offers to select the right part to leverage the benefit of additive manufacturing process. It narrows down on the ideal manufacturing process for the qualified parts and proposes to reduce subjectivity by using paired comparison of attributes. In addition to, it also provides a faster assessment of technical aspects of the design.

The embodiments of present disclosure herein addresses unresolved problem of having a clear framework for qualifying components or products that can be manufactured using additive manufacturing processes. The disclosure provides a system and method for assessing technical feasibility of additive manufacturing of one or more parts of an engineering design.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A system for assessing technical feasibility of additive manufacturing of one or more parts of an engineering design, the system comprising:
   a memory with a plurality of instructions;
   at least one processor, wherein the processor is communicatively coupled with the memory, and the processor is configured to:
   receive at least one input from user, wherein the received at least one input directs to a preliminary assessment, importance rating and technical assessment of the engineering design, and wherein the inputs relate to regulatory aspects, intellectual property laws compliance, and criticality of the engineering design;
   assess the engineering design, based on a plurality of attributes of one or more aspects of the engineering design, wherein the plurality of attributes are customizable to suit one or more aspects of the engineering design;
   assign weightage corresponding to each of the plurality of attributes based on paired comparison of the plurality of attributes using a predetermined minimum point method;
   assess each of the plurality of attributes by using decision matrix method to arrive at a weighted overall score for each of the plurality of attributes depending on the assigned weightage corresponding to each of the plurality of attributes; and
   recommend the most suitable additive manufacturing processes for the engineering design based on one or more predefined design rules and the weighted overall score, wherein the recommendation is used to decide whether to select an additive manufacturing process from a predefined list of additive manufacturing processes or to re-design for additive manufacturing process or to stop the assessment process over the engineering design, wherein summation of all the weighted overall scores on a weighted average basis indicates a potential for 3D printing of each part or assembly, and offers to select a right part to leverage benefits of the additive manufacturing process.

2. The system claimed in claim 1, comprises the plurality of attributes for the preliminary assessment of one or more aspects of the engineering design.

3. The system claimed in claim 1, wherein receiving inputs includes one or more assessment attributes, technical data and economic data.

4. The system claimed in claim 1, wherein assessment score corresponding to each of the plurality of attributes is obtained using detailed assessment module.

5. A method for assessing technical feasibility of additive manufacturing of one or more parts of an engineering design, the method comprising:

receiving at least one input from an user, wherein the received at least one input directs a preliminary assessment, importance rating and technical assessment of the engineering design, and wherein the inputs relate to regulatory aspects, intellectual property laws compliance, and criticality of the engineering design;

assessing one or more aspects of the engineering design, wherein the preliminary assessment module comprises a plurality of attributes for quick assessment of one or more aspects of the engineering design, wherein the plurality of attributes are customizable to suit one or more aspects of the engineering design;

assigning a weightage corresponding to each of the plurality of attributes, wherein the assignment based on paired comparison of the plurality of attributes using a predetermined minimum point method;

assessing each of the plurality of attributes by using decision matrix method to arrive at a weighted overall score for each of the plurality of attributes depending on the assigned weightage corresponding to each of the plurality of attributes; and recommending the most suitable additive manufacturing processes for the engineering design based on one or more predefined design rules, wherein the recommendation is used to decide whether to select an additive manufacturing process from a predefined list of additive manufacturing processes or to re-design for additive manufacturing process or to stop the assessment process over the engineering design, wherein summation of all the weighted overall scores on a weighted average basis indicates a potential for 3D printing of each part or assembly, and offers to select a right part to leverage benefits of the additive manufacturing process.

6. A non-transitory computer readable medium storing one or more instructions which when executed by a processor on a system, cause the processor to perform method for assessing technical feasibility of additive manufacturing of one or more parts of an engineering design comprising:

receiving at least one input from an user, wherein the received at least one input directs a preliminary assessment, importance rating and technical assessment of the engineering design, and wherein the inputs relate to regulatory aspects, intellectual property laws compliance, and criticality of the engineering design;

assessing one or more aspects of the engineering design, wherein the preliminary assessment module comprises of a plurality of attributes for quick assessment of one or more aspects of the engineering design, wherein the plurality of attributes are customizable to suit one or more aspects of the engineering design;

assigning a weightage corresponding to each of the plurality of attributes, wherein the assignment based on paired comparison of the plurality of attributes using a predetermined minimum point method;

assessing each of the plurality of attributes by using decision matrix method to arrive at a weighted overall score for each of the plurality of attributes depending on the assigned weightage corresponding to each of the plurality of attributes; and recommending the most suitable additive manufacturing processes for the engineering design based on one or more predefined design rules, wherein the recommendation is used to decide whether to select an additive manufacturing process from a predefined list of additive manufacturing processes or to re-design for additive manufacturing process or to stop the assessment process over the engineering design, wherein summation of all the weighted overall scores on a weighted average basis indicates a potential for 3D printing of each part or assembly, and offers to select a right part to leverage benefits of the additive manufacturing process.

* * * * *